June 28, 1949.  R. KELLY  2,474,255
POWER SUPPLY SYSTEM FOR CARRIER
COMMUNICATION SYSTEMS Filed Feb. 27, 1945  2 Sheets-Sheet 1

Inventor
RICHARD KELLY
By
Attorney

Patented June 28, 1949

2,474,255

UNITED STATES PATENT OFFICE 2,474,255

POWER SUPPLY SYSTEM FOR CARRIER COMMUNICATION SYSTEMS

Richard Kelly, London, England, assignor, by mesne assignments, to International Standard Electric Corporation, New York, N. Y., a corporation of Delaware Application February 27, 1945, Serial No. 579,991
In Great Britain March 10, 1944

2 Claims. (Cl. 171—97)

This invention relates to power supply arrangements for telecommunication systems and is an improvement in or modification of the invention described and claimed in the co-pending application Serial No. 494,344 now Patent Number 2,395,670, dated February 26, 1946.

In that application there is described an arrangement for supplying the low tension and high tension current for vacuum tube repeaters and the like from an alternating current source through a transformer having two secondary windings connected through rectifiers with the low tension and high tention load respectively, means being provided to vary the power supplied through the transformer to both secondary windings in response to voltage changes across the load so that the voltage across the load is maintained constant in spite of variations of the main supply voltage.

An object of the present invention is to provide such a power supply arrangement in which the voltage current characteristics of the low tension and high tension load circuits are matched to each other over the operating load range so that if both loads vary by the same percentage the output voltages on the low tension and high tension sides will bear the same ratio to each other.

Figure 1:
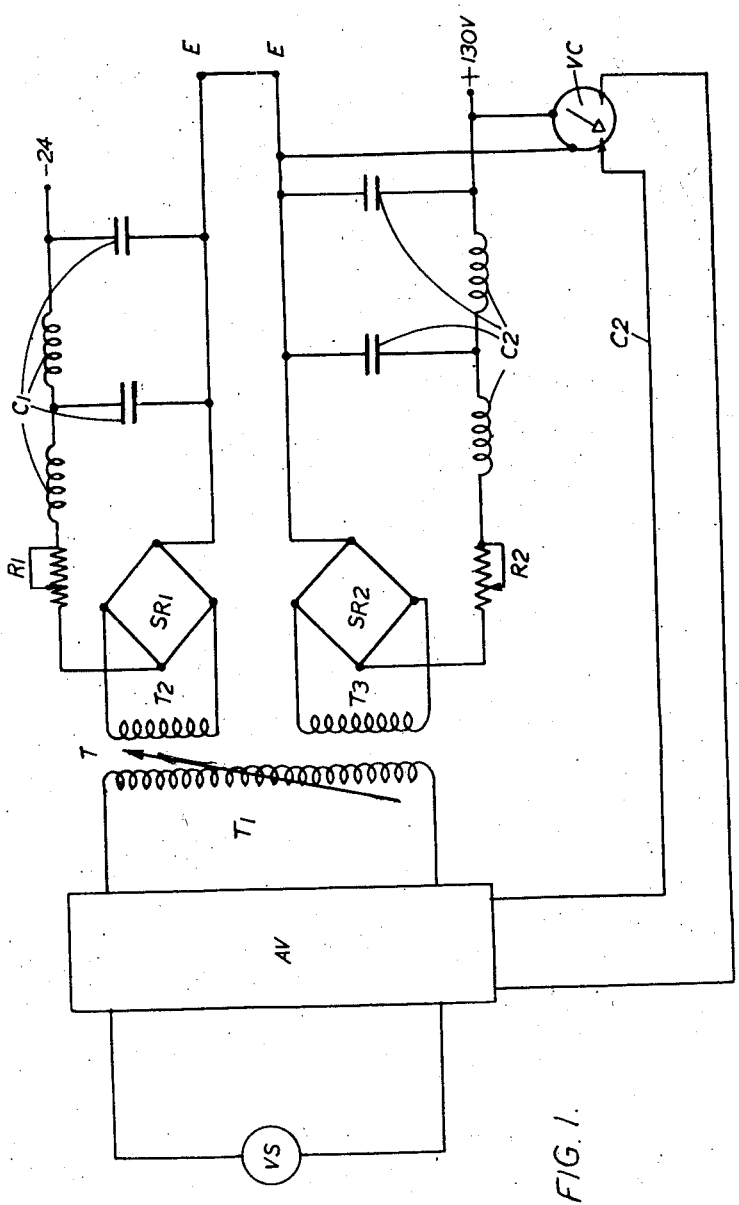
Figure 2:
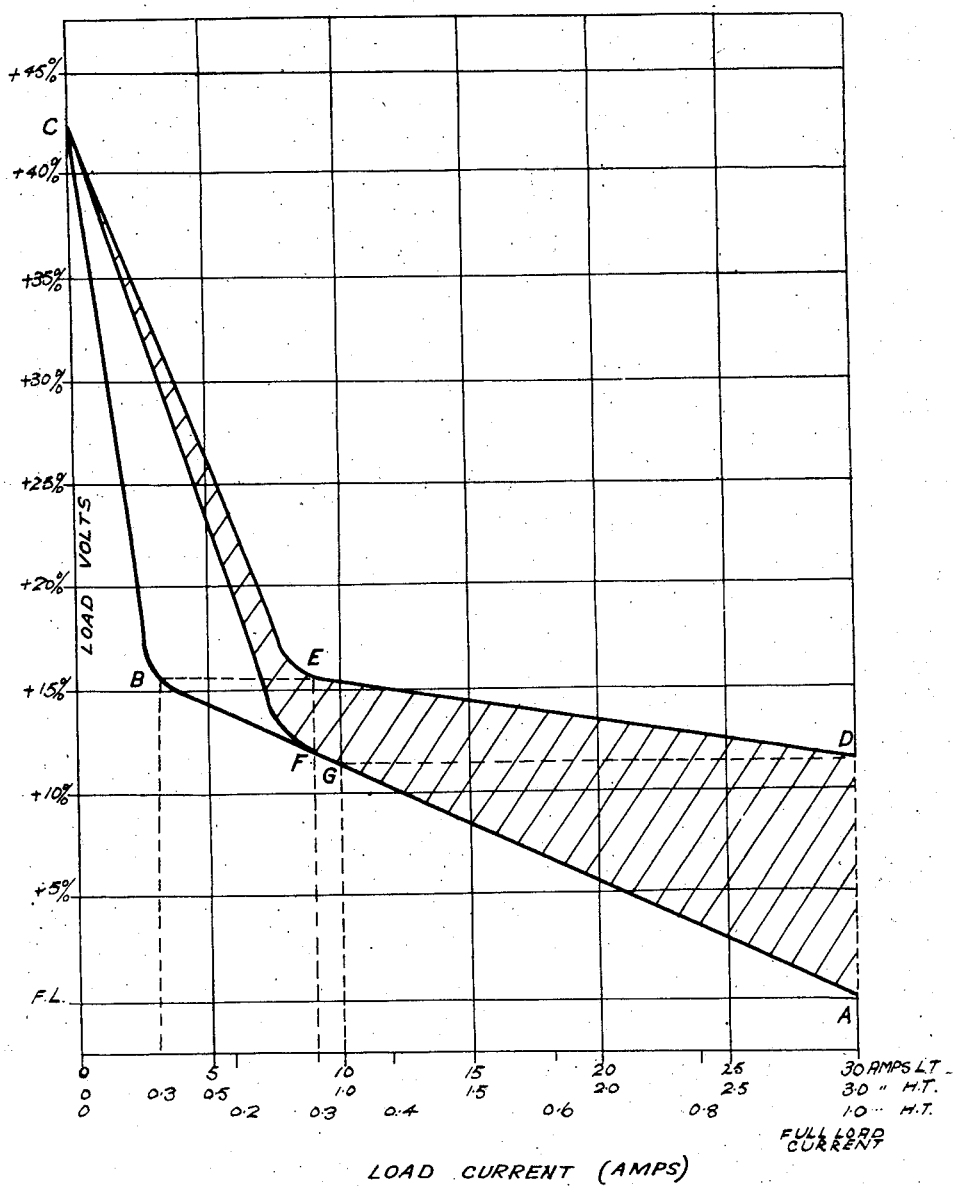

The nature of the present invention will be better understood by the following description taken in conjunction with the accompanying drawing in which Fig. 1 shows the arrangements described in the above-mentioned application together with certain improvements according to the present invention, whilst Fig. 2 is a curve for explanatory purposes.

Referring to Fig. 1 of the drawing, and alternating power supply source VS, for example, an alternating current mains supply, is connected to the primary $T_1$ of a transformer T having two secondary windings $T_2$ and $T_3$. Secondary winding $T_2$ supplies through a rectifier bridge $SR_1$ and smoothing elements $C_1$ a voltage of 24 volts for the cathode heaters of the thermionic valves of a carrier telephone system. Secondary winding $T_3$ supplies through rectifier bridge $SR_2$ and smoothing elements $C_2$ a voltage of 130 volts for the anode voltages of the above-mentioned thermionic valves. Across the output side of the elements $C_2$ is connected a voltage regulator relay VC which may be of the kind described in British Patent No. 515,948. This relay determines, in the manner described in the above-mentioned patent, a variation in the ratio of transformation between the voltages across VS and the voltages across $T_2$ and $T_3$ by controlling a motor which varies the effective turns of the primary $T_1$, as indicated by the arrow in the drawing affixed to the primary winding $T_1$. The rectangle AV represents such control arrangements as well as the switches connecting the source VS to the above-mentioned contact members, which are shown in the drawing of the above-mentioned patent. One of these switches is controlled by an overload coil connected across the output side of rectifier $SR_2$ but this is not shown in the accompanying drawing. The above arrangement is exactly as described in specification Serial No. 494,344.

It can be seen that with this arrangement, if the current drains on the low and high tension D. C. loads remain constant, then both output voltages remain constant for variation of the mains supply voltage. This follows from the fact that if the mains supply voltage varies, the control relay VC operates to vary the ratio of transformation between the voltage of the supply VS and that across the secondary $T_3$ until the relay VC restores to normal position and since the ratios between $T_2$ and $T_3$ are fixed, the ratio of transformation between VS and $T_2$ is adjusted to the same extent. If the high and low tension current drains vary in the same ratio, then the output voltages will remain substantially constant for variations of load, as well as for variations of the mains supply voltages.

According to one feature of the present invention the performance of the circuits in the above-mentioned respects is improved by matching the voltage current characteristics of the transformer, rectifiers and smoothing elements $C_1$ and $C_2$, over the operating load range, i. e. say full load to ⅒th full load. This may be understood from a consideration of Fig. 2. The curves shown in this figure are taken as examples of possible voltage current characteristics of the transformer, rectifiers and smoothing elements $C_1$ or $C_2$, voltages being represented as ordinates and currents as abscissae. Suppose, for example, that the normal full load current in the high tension load circuit of Fig. 1 is 3 amps. and in the low tension load circuit is 30 amps. Consider first the curve ABC as the voltage current characteristic across the output of smoothing elements $C_1$, point A representing 30 amps. and 24 volts (the full load current and voltage respectively). The point B represents one tenth of full load, a current of 3 amps. and a voltage 15.1% over the full load voltage. In order that the voltage current characteristics of the high tension supply arrangements, transformer $T_3$ rectifier $SR_2$ and smoothing elements $C_2$ should be matched to those of transformer $T_2$, rectifier $SR_1$ and smoothing elements $C_1$, it is necessary in the ideal case that the curve ABC should also represent the voltage current characteristic across the output of smoothing elements $C_2$ with point A representing the full load current of 3 amps. and the full load voltage of 130 volts, and other points on the curve such as B representing corresponding percentages of the full load current and voltage respectively. Then if both loads vary by the same percentage, the output voltages on the low tension and high tension sides will bear the same ratio to each other and as the output high tension voltage is maintained constant by the arrangements above described so also will the output low tension voltage. In practice, it is sufficient if the two curves coincide between full load and one-fifth of full load. In the case of curve ABC it will be seen that the straight portion AB extends down to one-tenth of full load and matching to this extent is readily possible.

The arrangement as so far described gives the correct regulation only for one given initial ratio of the loads on the high and low tension sides. In order that the one piece of apparatus can be adapted to be set for correct operation for different initial load ratios, variable resistances $R_1$ and $R_2$ are inserted in both the load circuits.

These resistances $R_1$ and $R_2$ are both zero for the case in which the initial full loads are the maxima of those for which the unit is designed. The manner in which the resistances are changed for other circumstances will be clear from an example. It is assumed that the maximum high tension load current is 3 amps. and low tension load current 30 amps. Now suppose that it is required to use the unit for the regulation of a supply of low tension the same as before viz., full load 30 amps. at 24 volts with a high tension full load of 1 amp. at 130 volts. From Fig. 2 it will be seen that if ABC is the curve for the former case, in the latter case operation will take place only over the portion GBC of the curve for the high tension. If this portion of the curve is drawn to a scale corresponding to the new conditions it becomes DEC. The resistance $R_2$ is then increased from zero until the full load current is represented by point A, so that the voltage AD is the voltage drop in the resistance $R_2$ and is the new full load current multiplied by the resistance $R_2$, the new characteristic curve becomes AFC. Consequently over the range AF the voltage current characteristics of the low tension and high tension supplies are coincident, and for a variation of load over this range the output voltages of both low and high tension supplies are maintained exactly constant. It will be seen that with the curves shown the matching of the characteristics is accomplished only over the range AF which is the range between full load and approximately one-third of full load. This is because the curve CED has been shown for the purpose of clearness of illustration as spaced some distance from the curve CBA. It is to be understood, however, that in practice the matching of the characteristics should take place over the range between full load and one-fifth of full load as stated previously and this means, if the unit is adapted, by the provision of resistance for use with different ratios of high tension and low tension loads, the range between full load and one-fifth of the minimum full load for which the unit is to function.

In the same way as described above the unit may be adjusted for correct performance when the low tension full load is less than 30 amps. by adjustment of the resistance $R_1$.

It is to be understood that, as described in Serial No. 494,344, now Patent Number 2,395,670, dated February 26, 1946, the regulating relay VC may be placed across the low tension load only or across both loads in series.

What is claimed is:

1. Power supply device for telecommunication systems and the like using thermionic valves and deriving energy from an alternating current power supply source including a primary winding connected to said alternating current supply source and having two secondary windings, two rectifiers, each connected to one secondary winding, a low tension load circuit and a high tension load circuit for said thermionic valves connected respectively one to each of said rectifiers, a control relay connected to at least one of said load circuits and responsive to voltage changes therein, transformer control means for varying the effective turns of said primary winding connected to and operable by said control relay whereby changes in the load circuit to which the control relay is connected will cause changes in said transformer primary thereby causing corresponding voltage changes in both said secondary windings and means for matching the voltage current characteristics of the low tension and high tension load circuits over the operating load range so that the output voltages on the low tension and high tension load circuits will bear the same ratio to each other during all variations of the load in said load circuits over said operating load range.

2. Power supply device according to claim 1, wherein said means for matching the voltage current characteristics of the low tension and high tension load circuits comprises a variable resistance in each of the said load circuits whereby said device is adapted to be set for correct operation for different initial load ratios in said low tension and high tension load circuits.

RICHARD KELLY.

REFERENCES CITED

The following references are of record in the file of this patent:

UNITED STATES PATENTS

| Number | Name | Date |
| --- | --- | --- |
| 1,822,618 | Gebhard | Sept. 8, 1931 |
| 1,849,518 | Gay | Mar. 15, 1932 |